United States Patent
Huh et al.

(10) Patent No.: US 8,121,974 B2
(45) Date of Patent: Feb. 21, 2012

(54) METHOD OF GENERATING NODE INDENTIFIER IN TREE STRUCTURE

(75) Inventors: Mi Suk Huh, Suwon-si (KR); Dae Youb Kim, Seoul (KR); Tae-Chul Jung, Seongnam-si (KR); Hwan Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 662 days.

(21) Appl. No.: 11/785,672

(22) Filed: Apr. 19, 2007

(65) Prior Publication Data
US 2008/0086448 A1   Apr. 10, 2008

(30) Foreign Application Priority Data
Oct. 10, 2006   (KR) .................. 10-2006-0098374

(51) Int. Cl.
G06F 7/00 (2006.01)
G06F 17/00 (2006.01)
(52) U.S. Cl. ............................................. 707/600
(58) Field of Classification Search .................. 707/600
See application file for complete search history.

(56) References Cited

U.S. PATENT DOCUMENTS

| | | | |
|---|---|---|---|
| 6,438,540 B2 * | 8/2002 | Nasr et al. ................. | 707/3 |
| 2003/0084187 A1 * | 5/2003 | Choe ........................ | 709/238 |
| 2003/0110150 A1 * | 6/2003 | O'Neil et al. .............. | 707/1 |
| 2005/0160158 A1 * | 7/2005 | Firebaugh et al. .......... | 709/223 |
| 2006/0004858 A1 * | 1/2006 | Tran et al. ................. | 707/104.1 |

FOREIGN PATENT DOCUMENTS

| | | |
|---|---|---|
| JP | 05-153148 | 6/1993 |
| JP | 2005-051649 | 2/2005 |
| KR | 1020040107698 | 12/2004 |
| KR | 1020060031257 | 4/2006 |
| KR | 1020060046990 | 5/2006 |
| KR | 1020060049340 | 5/2006 |

* cited by examiner

*Primary Examiner* — Robert Timblin
*Assistant Examiner* — Nicholas Allen
(74) *Attorney, Agent, or Firm* — NSIP Law

(57) ABSTRACT

Provided are a method of generating a node identifier including padding information and location information, in a tree structure, a computer-readable storage medium storing a program for executing a method of generating a node identifier in a tree structure, and a terminal apparatus using the tree structure. The location information is generated by using branch identifiers, each of the branch identifiers being allocated for each branch from a root node to a target node. The padding information is generated by a padding code, which includes information about a group of the target node, and depth information, which includes information about a level of the target node in the tree structure.

29 Claims, 5 Drawing Sheets

US 8,121,974 B2

METHOD OF GENERATING NODE INDENTIFIER IN TREE STRUCTURE

CROSS-REFERENCE TO RELATED APPLICATION

This application claims the benefit under 35 U.S.C. §119(a) of Korean Patent Application No. 10-2006-0098374, filed on Oct. 10, 2006, in the Korean Intellectual Property Office, the entire disclosure of which is hereby incorporated by reference.

BACKGROUND OF THE INVENTION

1. Field of the Invention

The present invention relates to a method of generating a node identifier in a tree structure. More particularly, the present invention relates to a method of generating a node identifier to easily ascertain a location of a node in a k-nary tree structure.

2. Description of Related Art

Along with the development of wireless communication and digital broadcasting technologies, service providers offer users a variety of contents via wire or wireless networks. Service providers having a number of users, manage service user groups by using a tree structure for reliable service. Under an environment where group members are frequently changed and are managed using a tree structure, the tree structure may quickly become unbalanced due to the frequent entry and withdrawal of a group member. Accordingly, each group member corresponding to a leaf node in the tree structure has a different depth value. Therefore, in an unbalanced tree structure, the depth value of each leaf node is different, as opposed to a balanced tree structure where all leaf nodes have an identical depth value. Accordingly, depth information of group members in an unbalanced tree structure is required to be additionally provided. Also, a method of ascertaining the depths of leaf nodes and intermediate nodes, and a path from a root node to a target node, is required to be provided so as to easily ascertain a location of the target node and efficiently use the method when updating changed information of group members.

FIG. 1 is a diagram illustrating a method of generating a node identifier in a conventional binary tree structure.

In FIG. 1, the binary tree includes a root node 100, left and right nodes of a first level 102 and 104, nodes of a second level 106, 108, 110, and 112, nodes of a third level, and nodes of a fourth level. In this instance, the root node 100 branches off to the nodes of the first level 102 and 104, and each of the left and right nodes of the first level 102 and 104 branches off to the nodes of the second level 106, 108, 110, and 112. Also, each of the nodes of the second level 106, 108, 110, and 112 branches off to the nodes of the third level, and the nodes of the third level branches off to the nodes of the fourth level.

According to the method of generating a node identifier in a conventional binary tree structure, a node identifier of the root node 100 is generated as 0, a node identifier of the left node 102 of the first level is generated as 1, and a node identifier of the right node 104 of the first level is generated as 2. Node identifiers of the nodes of the second level 106, 108, 110, and 112 are sequentially generated from left to right as 3, 4, 5, and 6, in ascending order, respectively. Similarly, node identifiers of the nodes of the third level and fourth level are sequentially generated.

According to the method of generating a node identifier in a conventional binary tree structure, when members corresponding to each node are repeatedly added and deleted as time passes, an unbalanced tree structure such as an example tree structure illustrated in FIG. 2 is generated. According to the conventional art, in the unbalanced tree structure as illustrated in FIG. 2, a fixed rule for indicating a location and depth information of each node may not be acquired, and thus a member management and tree structure update may not be efficiently performed. Accordingly, there is a need for a method of generating a node identifier to easily ascertain a location of a node in a tree structure.

SUMMARY OF THE INVENTION

Exemplary embodiments of the present invention address at least the above problems and/or disadvantages and provide at least the advantages described below. Accordingly, an aspect of exemplary embodiments of the present invention is to provide a method of generating a node identifier in a tree structure which may easily generate a node identifier which reflects location information of a node in the tree structure.

An aspect of exemplary embodiment of the present invention also provides a method of generating a node identifier in a tree structure, where the node identifier enables a node belonging to the tree structure to ascertain a group that the node vertically belongs to and a level that the node horizontally belongs to, and thereby may easily ascertain a location of the node in the tree structure.

An aspect of exemplary embodiment of the present invention also provides a method of generating a node identifier in a tree structure which may efficiently update a tree structure.

According to an aspect of exemplary embodiments of the present invention, provided is a method of generating a node identifier in a tree structure, the method including: generating location information about a path from a root node to a target node of a tree; and generating a node identifier of the target node by combining the location information and a padding information. The location information is generated by using branch identifiers, where each of the branch identifiers is allocated for each branch from the root node to the target node. Additionally, the padding information is generated by inserting a padding code as many times as a value of the depth information.

According to another aspect of exemplary embodiments of the present invention, a terminal apparatus including: a location information storage for storing location information about a path from a root node to a target node of a tree; and a padding information storage for storing padding information including a padding code and depth information of the target node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
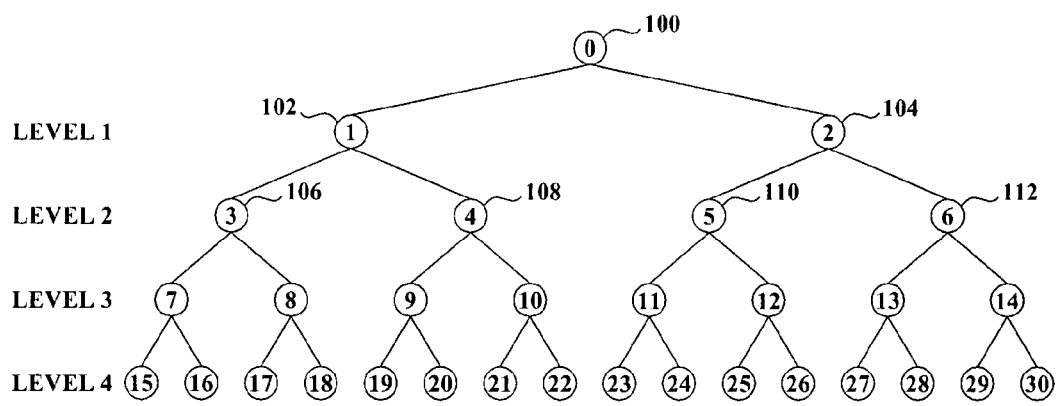
FIG. 1 is a diagram illustrating a method of generating a node identifier in a conventional binary tree structure.
Figure 2:
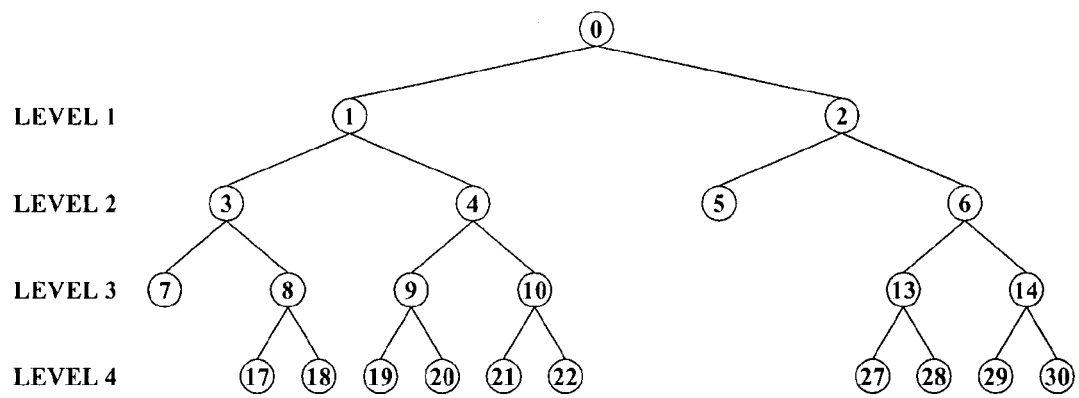
FIG. 2 is a diagram illustrating an example of the binary tree structure of FIG. 1 which may form as time passes.
Figure 3:
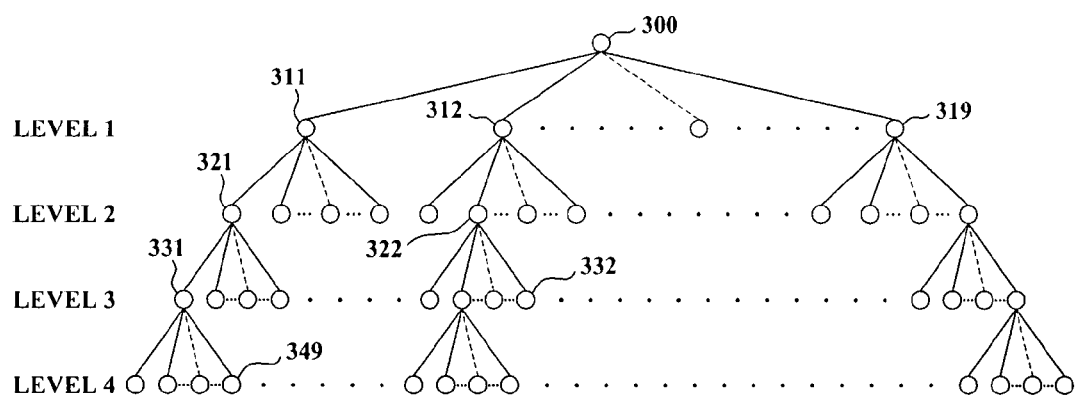
FIG. 3 is a diagram illustrating a method of generating a node identifier in a tree structure according to an exemplary embodiment of the present invention.

FIG. 3 is a diagram illustrating a method of generating a node identifier in a tree structure according to an exemplary embodiment of the present invention. Specifically, FIG. 3 illustrates a k-nary tree structure, and more particularly a 9-nary tree structure.

Referring to FIG. 3, a root node 300 branches off to nodes 311, 312, . . . , 319. Each of the nodes 311, 312, . . . , 319 branches off to a k number of nodes, which are nodes of a second level. Each of nodes of the second level branches off to the k number of nodes, which are nodes of a third level. Each of nodes of the third level branches off to the k number of nodes, which are nodes of a fourth level.

In the k-nary tree structure of FIG. 3, leaf nodes belong to the fourth level, and intermediate nodes belong to the first level, second level, and third level, respectively. When a target node to determine a node identifier is a 49th node 349, that is a ninth node from a left side of the fourth level, a method of determining the node identifier of the target node, that is the 49th node 349, is described in detail.

According to an exemplary embodiment of the present invention, location information with respect to a path from the root node 300 to the target node is generated, where the location information is generated by using branch identifiers. Each of the branch identifiers is allocated for each branch from the root node 300 to the target node. According to an exemplary embodiment of the present invention, the location information is generated by sequentially allocating the branch identifiers, where each of the branch identifiers are allocated for each branch from the root node 300 to the target node.

The branch identifier corresponds to an identifier which identifies at least one child node with respect to a parent node.

An 11th node 311 of the first level branches off from the root node 300, and has a branch identifier '1'. Similarly, a 19th node 319 of the first level branches off from the root node 300, and has a branch identifier '9'. A 21st node 321 of the second level branches off from the 11th node 311, and has a branch identifier '1'. A 31st node 331 of the third level branches off from the 21st node 321, and has a branch identifier '1'. A 49th node 349 of the fourth level branches off from the 31st node 331, and has a branch identifier '9'.

Accordingly, when determining the node identifier of the target node, the location information includes information about the path from the root node 300 to the target node. The branch identifier of the 11th node 311 is 1, the branch identifier of the 21st node 321 is '1', the branch identifier of the 31st node 331 is '1', and the branch identifier of the 49th node 349 is '9'. Accordingly, when allocating each of the branch identifiers sequentially from a top level, the location information becomes '1119'. In this instance, each of the branch identifiers is allocated for each branch from the root node 300 to the target node. Also, according to another exemplary embodiment of the present invention, when allocating each of the branch identifiers sequentially from a lowest level, the location information becomes '9111'.

According to an exemplary embodiment of the present invention, the method of generating a node identifier in a tree structure comprises combining location information and padding information. For example, when the target node is the 49th node 349, the node identifier is produced by combining the padding information, which for this example may be '2', and location information '1119' resulting in a node identifier of '21119'. Additionally, the branch identifier digit adjacent the padding information, which in this example is the first '1' to the right of padding information '2', corresponds to a group identifier of the target node.

The padding information and how it is determined will be described after a group identifier is described in detail below.

A group is a set of at least one node, where the group identifier identifies the group. According to an exemplary embodiment of the present invention, a group identifier of the target node corresponds to a branch identifier with respect to a first branch of the path from the root node 300 to the target node. Specifically, in the tree structure of FIG. 3, the group is a set to which all descendant nodes belong. All descendant nodes are included in the first level, second level, third level, and fourth level. The 11th node 311 and its descendant nodes belong to a first group, and have a group identifier '1'. Similarly, the 12th node 312 and its descendant nodes form a second group, and have a group identifier '2'. As described above, when determining a group to which the nodes belong to and providing the group identifier, the 19th node 319 and its descendant nodes form a 9th group, and have a group identifier '9'.

In the exemplary embodiment of the present invention, the node identifier includes the location information and the padding information.

The padding information fills remaining storage space after the location information is placed in the node identifier. Also, the padding information is generated by inserting a padding code as many times as a value of the depth information.

The padding information comprised of the padding code is described in detail below.

The padding code is determined based on the group identifier. According to an exemplary embodiment of the present invention, the padding code is selected from values excluding the group identifier of the target node. A branch identifier digit adjacent to the padding information corresponds to the group identifier of the target node. Specifically, the branch identifier digit is adjacent to the padding information, and the padding code of the padding information is selected from the values excluding the group identifier of the target node. Accordingly, the padding information and the location information in the node identifier may be easily distinguished. Also, each of the nodes belonging to a same group has a node identifier which is generated by using a same padding code. Specifically, each of the nodes belonging to the same first branch from the root node has the same padding code.

Also, according to another exemplary embodiment of the present invention, the padding code of the target node is selected from the values excluding the group identifier of the target node and excluding a padding code which is used in another group. Accordingly, each group may use a different padding code. Thus, according to the other exemplary embodiment of the present invention, a group to which the target node belongs may be ascertained by the padding code included in the node identifier of the target node.

Depth information is information about a depth of the target node in the tree structure. Also, the depth information is determined based on a level of the target node and a lowest level of the tree. According to an exemplary embodiment of the present invention, the depth information is determined by adding a predetermined value, for example, 1, and a difference between the level of the target node and the lowest level of the tree. The padding information is generated by inserting the padding code as many times as the value of the depth information.

Hereinafter, a method of generating the padding information is described in detail. In this instance, the depth information is determined by adding 1 to the difference between the level of the target node and the lowest level of the tree. The determined depth information and the padding code are used for generating the padding information, where the depth information is the number of times the padding code is to be repeated to make up the padding information.

In FIG. 3, one of the group identifiers is selected as the padding code and is used depending on the depth information to produce the padding information. In FIG. 3, the group identifier corresponds to the branch identifier with respect to the first branch of the path from the root node 300 to the target node, which is the 49th node 349. All group identifiers correspond to 1-9 for this 9-nary tree structure and when the target node corresponds to the 49th node 349, the group identifier of the 49th node 349, which is determined to be 1 is excluded from the set of numbers that the padding code may be selected from. Additionally, when a padding code is selected by another group, the padding code being used by another group is excluded from the set of numbers that the padding code may be selected from. When a padding code is not used by another group, the available padding code of the 49th node 349 may be 2-9. In this instance, the padding code of the first group is selected as 2. The depth information, which determines how many times the padding code is repeatedly inserted, is calculated and will be described. The 49th node 349 belongs to the fourth level, and the lowest level corresponds to 4. Accordingly, the depth information, which is determined by adding 1 to the difference between the level of the target node (the 49th node 349) and the lowest level of the tree, results in the depth information to be 1. Thus, the padding information of the target node (the 49th node 349), is determined to be '2', since the padding code is repeated only one time due to the depth information having a value of '1' in this example.

Accordingly, the node identifier of the 49th node 349 becomes '21119' by combining the padding information '2' and the location information '1119'. In this instance, the padding code '2' is different from the branch identifier '1' which is adjacent to the padding information '2', of the branch identifiers '1', '1', '1', and '9' comprising the location information '1119'. As described above, the padding code is different from the branch identifier adjacent to the padding information, and thus, the padding information and the location information in the node identifier may be easily distinguished.

As another exemplary embodiment of the present invention, the location information of the 49th node 349 that is the target node 349, may be '9111'. The '9111' is determined when the branch identifiers from the root node 300 to the target node (the 49th node 349) are sequentially allocated from right to left. When determining the padding information as '2', the node identifier of the 49th node 349 becomes '91112' by combining the padding information '2' and the location information '9111'.

When the target node corresponds to the 32nd node 332 which is included in the second group, a method of determining a node identifier is described in detail.

As described above, the group identifier of the 32nd node 332 becomes '2'. Also, the location information of the 32nd node 332 is determined to be '229'. The '229' is determined by sequentially allocating a branch identifier of the 12th node 312, '2', a branch identifier of a 22nd node 322, '2', and a branch identifier of the 32nd node 332, '9'. Also, the node identifier of the 32nd node 332 may be '922'.

The padding code of the 32nd node 332 may be selected to be '3', which is not the group identifier of the 32nd node 332, '2', or the padding code which is selected in the first group, '2'. Also, a level of the 32nd node 332 is 3, and a lowest level is 4. Accordingly, when adding 1 to a difference between the final level and the level of the 32nd node 332, depth information of the 32nd node 332 becomes '2' and results in padding information of the 32nd node 332 to be '33', which is the padding code repeated twice.

Accordingly, the node identifier of the 32nd node 332, that is the target node, is determined to be '33229'. The '33229' is determined by combining the padding information '33' and the location information '229'.

Thus, the level of the target node is easily determined, based on the number of the padding code of the node identifier of the target node. As an example, the node identifier of the 49th node 349 is '21119', a single padding code '2' exists, and thus it is ascertained that the 49th node 349 is in the lowest level. Also, in the current example, when information of the lowest level is ascertained, the lowest level is '4' in the tree structure, and thus the level of the 49th node 349 is '4'. Similarly, the node identifier of the 32nd node 332 is '33229', that is two '3' padding codes are included, and thus it is ascertained that the level of the 32nd node 332 corresponds to 'the lowest level minus 1'. Also, in the current example, when the information of the lowest level is ascertained, the lowest level is '4' in the tree structure, and thus the level of the 32nd node 332 is '3'.

Also, a group to which the target node belongs is determined based on the padding code of the node identifier of the target node in the tree structure. As an example, the node identifier of the 49th node 349 is '21119', and the padding code of the 49th node 349 is '2'. The padding code '2' is used in the first group. Accordingly, the 49th node 349 belongs to the first group. For this, when determining the padding code of the target node, the padding code of the target node is determined excluding the padding code which is used in another group. Also, each of the nodes belonging to a same first branch from the root node has a same padding code, and thus, each of the nodes belonging to the same group uses the same padding code. Similarly, the node identifier of the 32nd node 332 is '33229', and the padding code of the 32nd node 332 is '3'. The padding code '3' is used in the second group. Accordingly, the 32nd node 332 belongs to the second group.

Thus, the location of the target node may be easily ascertained through the padding information and the location information which are deduced by the node identifier. Also, the tree structure may be efficiently managed.

Hereinafter, referring to FIG. 4, a method of generating a node identifier in a binary tree structure is described in detail. In this instance, the binary tree structure refers to a k-nary tree structure when a value of k is 2.

Figure 4:
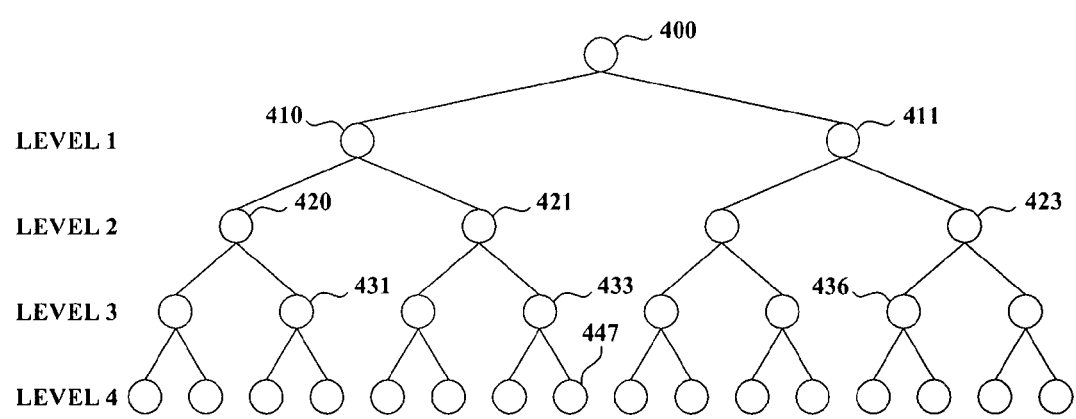
FIG. 4 is a diagram illustrating a method of generating a node identifier in a binary tree structure according to an exemplary embodiment of the present invention.

When a target node is a 31st node 431 in FIG. 4, a branch identifier of a 10th node 410 which branches off from a root node 400 is '0'. Also, a branch identifier of a 20th node 420 is '0', and a branch identifier of the 31st node 431 is '1'. Accordingly, location information of the 31st node 431 is determined to be '001'.

The 31st node 431 belongs to a first group, and a group identifier of the 31st node 431 is '0'. Accordingly, a padding code of the 31st node 431 is determined to be '1', and depth information of the 31st node 431 becomes '2'. In this instance, the padding code '1' is selected excluding the group identifier of the 31st node 431, '0'. Accordingly, padding information of the 31st node 431 becomes '11'. Specifically, the padding information is generated by inserting the padding code '1' as many times as the value of the depth information '2'.

Accordingly, a node identifier of the 31st node 431, which is the target node 431, is determined to be '11001' by combining the padding information '11' and the location information '001'.

When the target node is a 47th node 447 in FIG. 4, a branch identifier of the 10th node 410 which branches off from the root node 400 is '0'. Also, a branch identifier of a 21st node 421 is '1', a branch identifier of the 33rd node 433 is '1', and a branch identifier of the 47th node 447 is '1'. Accordingly, location information of the 47th node 447 is determined to be '0111'.

The 47th node 447 belongs to the first group, and a group identifier of the 47th node 447 is '0'. Accordingly, a padding code of the 47th node 447 is determined to be '1', and depth information of the 47th node 447 becomes '1'. Accordingly, padding information of the 47th node 447 becomes '1'. Specifically, the padding information is generated by inserting as many of the padding code '1' as the value of the depth information '1'.

Accordingly, a node identifier of the 47th node 447, i.e. the target node 447, is determined to be '10111' by combining the padding information '1' and the location information '0111'.

When a target node is a 36th node 436 in FIG. 4, a branch identifier of the 11th node 411 which branches off from the root node 400 is '1'. Also, a branch identifier of a 23rd node 423 is '1', and a branch identifier of the 36th node 436 is '0'. Accordingly, location information of the 36th node 436 is determined to be '110'.

The 36th node 436 belongs to a second group, and a group identifier of the 36th node 436 is '1'. Accordingly, a padding code of the 36th node 436 is determined to be '0', and depth information of the 36th node 436 becomes '2'. In this instance, the padding code '0' is selected excluding the group identifier of the 36th node 436 and the padding code used in the first group, '1'. Accordingly, padding information of the 36th node 436 becomes '00'. Specifically, the padding information is generated by inserting as many of the padding code '0' as a value of the depth information '2'.

Accordingly, a node identifier of the 36th node 436, which is the target node, is determined to be '00110' by combining the padding information '00' and the location information '110'.

As an example, the node identifier of the 36th node 436, '00110', is comprised of the padding information located on a left-hand side and the location information located in a right side. The 36th node 436 belongs to the second group, and a first branch identifier of the second group is '1'. Accordingly, when reading the node identifier from left to right, the padding information corresponds to a value in front of the first branch identifier of the second group '1', that is a group identifier of the second group. Thus, according to an exemplary embodiment of the present invention, the padding information '00' is easily extracted by the node identifier '00110'. Similarly, when comprising the padding information on the right-hand side and the location information on the left-hand side, a node identifier of the 36th node 436 is '01100'. In this instance, when reading the node identifier from right to left, the padding information corresponds to a value in front of the group identifier of the second group '1'.

It is easily ascertained that the padding code of the 36th node 436 is '0', and the depth information of the 36th node 436 is '2', from the padding information of the 36th node 436, '00'. Accordingly, through the padding code of the 36th node 436 '0', it is ascertained that the 36th node 436 belongs to the first group. Also, through the depth information, '2', it is ascertained that the 36th node 436 belongs to one level above a final/lowest level, a third level. Through the location information of the 36th node 436 '110', which is located behind the padding information, a path where the 36th node 436 branches off from the root node 400 is ascertained. Thus, information about a group that a corresponding node vertically belongs to, a level that the corresponding node horizontally belongs to, and the path where the corresponding node passes from the root node, is ascertained by the node identifier including the padding information and the location information.

The method of generating a node identifier in a tree structure according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the exemplary embodiments of the present invention, or they may be of the kind well-known and available to those having skill in the computer software arts. Examples of computer-readable media include but are not limited to magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The computer-readable recording medium can also be distributed over network-coupled computer systems so that the computer-readable code is stored and executed in a distributed fashion. The media operation/application may also be embodied in a transmission media such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 5:
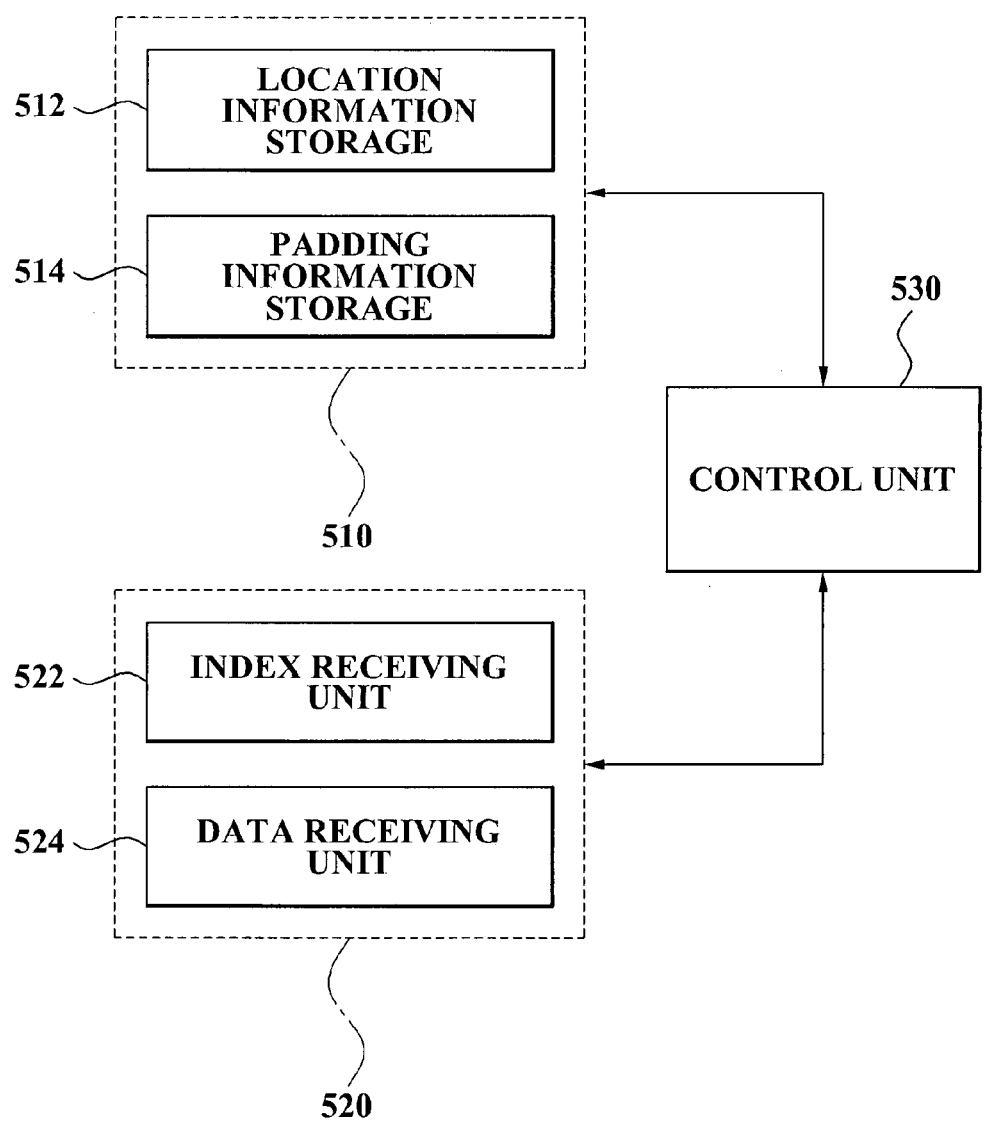
FIG. 5 is a diagram illustrating a configuration of a communication terminal apparatus where a k-nary tree structure of FIG. 3 is applied.

FIG. 5 is a diagram illustrating a configuration of a communication terminal apparatus 500 where a k-nary tree structure of FIG. 3 is applied. The communication terminal apparatus 500 includes node identifier storage 510, receiving unit 520, and control unit 530.

A location information storage 512 of the node identifier storage 510 stores location information about a path from a root node to a target node. For example, the location information may be generated by sequentially allocating branch identifiers. Each of the branch identifiers are allocated for each branch from the root node to the target node. Also, the branch identifier digit adjacent to the padding information corresponds to a group identifier of the target node. The group identifier of the target node corresponds to a branch identifier with respect to a first branch of the path from the root node to the target node.

A padding information storage of the node identifier storage 510 stores the padding information of the target node. In this instance, the padding information includes a padding code and depth information of the target node. According to an exemplary embodiment of the present invention, the padding information is generated by inserting the padding code as many times as a value of the depth information. The padding code is selected from values excluding the group identifier of the target node. Also, the padding code is selected excluding a padding code which is used in another group. Each of nodes belonging to a same group uses a same padding code. The depth information is determined based on a level of the target node and a lowest level of a tree. As an example, the depth information is determined by adding a predetermined value to a difference between the level of the target node and the lowest level of the tree.

The receiving unit 520 receives a packet including data and index information from a transmitting unit of another node in the tree. The transmitting unit of the other node is not illustrated in FIG. 5. The index information of the received packet is stored in an index receiving unit 522 and the data is stored in a data receiving unit 524.

The control unit 530 compares a destination address and information stored in the node identifier storage 510. The destination address is included in the index information received via the receiving unit 520. In this instance, instead of comparing the index information and all information stored in the node identifier of a corresponding target node, when comparing the index information and the padding information only, it may be determined whether the received packet is for a group of the corresponding target node as a destination. When it is determined that the received packet is for another group as the destination, a comparison operation described above may be omitted and a subsequent operation may be performed.

According to an aspect of exemplary embodiments of the present invention, a method of generating a node identifier in a tree structure may easily generate a node identifier of a node, and location information of the node in the tree structure may reflect the node identifier of the node.

Also, according to an aspect of exemplary embodiments of the present invention, the node identifier includes padding information and location information. The padding information provides information about a group the node vertically belongs to and a level the node horizontally belongs to in order to easily ascertain a location of the node in the tree structure. Also, the location information provides information about a path from a root node to the node of the node identifier.

Also, according to an aspect of exemplary embodiments of the present invention, when analyzing a node identifier included in a destination address of a packet which is received by a communication terminal apparatus, the communication terminal apparatus may easily determine a location of a target node of the packet in a tree structure by analyzing padding information first. Thus, a communication of the communication terminal apparatus which is managed by the tree structure may be efficiently processed.

Also, according to an aspect of exemplary embodiments of the present invention, a method of generating a node identifier in a tree structure may efficiently update the tree structure is provided.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of generating a node identifier in a tree structure, the method comprising:
    generating location information about a path from a root node to a target node of a tree, the location information including at least a first branch identifier indicating the order that the target node branches from its respective parent node;
    generating a group identifier for each initial node that directly branches from the root node, wherein each respective child node of an initial node shares the same group identifier;
    selecting a padding code that has a value of a group identifier that is different from a value of a group identifier of an initial node corresponding to the target node;
    generating padding information by inserting the padding code one or more times based on a value of depth information of the target node in the tree structure; and
    generating a node identifier of the target node by combining the location information and padding information.

2. The method of claim 1, wherein each of the branch identifiers is allocated for each branch from the root node to the target node.

3. The method of claim 1, wherein the location information is generated by sequentially allocating branch identifiers, each of the branch identifiers being allocated for each branch from the root node to the target node.

4. The method of claim 3, wherein a branch identifier digit adjacent to the padding information corresponds to a branch identifier with respect to a first branch of the path from the root node to the target node.

5. The method of claim 1, wherein the group identifier of the target node corresponds to a branch identifier with respect to a first branch of the path from the root node to the target node.

6. The method of claim 5, wherein each of nodes belonging to a same first branch from the root node has a same padding code.

7. The method of claim 6, further comprising:
    determining a group which the target node belongs to, based on a padding code of the node identifier of the target node.

8. The method of claim 1, wherein the padding code is selected from the values excluding the group identifier of the target node, and excluding a padding code which is used in another group.

9. The method of claim 1, wherein the padding code is a value excluding a branch identifier adjacent to the padding information, of the branch identifier comprising the location information.

10. The method of claim 9, wherein a branch identifier digit adjacent to the padding information corresponds to a branch identifier with respect to a first branch of the path from the root node to the target node.

11. The method of claim 1, wherein the depth information is determined based on a level of the target node and a lowest level of the tree.

12. The method of claim 11, wherein the depth information is determined by adding a predetermined value to a difference between the level of the target node and the lowest level of the tree.

13. The method of claim 11, further comprising:
  determining the level of the target node, based on a number of occurrences of the padding code of the node identifier of the target node.

14. A computer-readable storage medium storing a program for executing a method of generating a node identifier in a tree structure, the method comprising:
  generating location information about a path from a root node to a target node of a tree, the location information including at least a first branch identifier indicating the order that the target node branches from its respective parent node;
  generating a group identifier for each initial node that directly branches from the root node, wherein each respective child node of an initial node shares the same group identifier;
  selecting a padding code that has a value of a group identifier that is different from a value of a group identifier of an initial node corresponding to the target node;
  generating padding information by inserting the padding code one or more times based on a value of depth information of the target node in the tree structure; and
  generating a node identifier of the target node by combining the location information and padding information.

15. The computer-readable storage medium of claim 14, wherein each of the branch identifiers is allocated for each branch from the root node to the target node.

16. The computer-readable storage medium of claim 14, wherein the location information is generated by sequentially allocating branch identifiers, each of the branch identifiers being allocated for each branch from the root node to the target node.

17. The computer-readable storage medium of claim 16, wherein a branch identifier digit adjacent to the padding information corresponds to a branch identifier with respect to a first branch of the path from the root node to the target node.

18. The computer-readable storage medium of claim 14, wherein the group identifier of the target node corresponds to a branch identifier with respect to a first branch of the path from the root node to the target node.

19. The computer-readable storage medium of claim 18, wherein each of nodes belonging to a same first branch from the root node has a same padding code.

20. The computer-readable storage medium of claim 19, wherein the method further comprises:
  determining a group which the target node belongs to, based on a padding code of the node identifier of the target node.

21. The computer-readable storage medium of claim 14, wherein the padding code is selected from the values excluding the group identifier of the target node, and excluding a padding code which is used in another group.

22. The computer-readable storage medium of claim 14, wherein the padding code is a value excluding a branch identifier adjacent to the padding information, of the branch identifier comprising the location information.

23. The computer-readable storage medium of claim 22, wherein a branch identifier digit adjacent to the padding information corresponds to a branch identifier with respect to a first branch of the path from the root node to the target node.

24. The computer-readable storage medium of claim 14, wherein the depth information is determined based on a level of the target node and a lowest level of the tree.

25. The computer-readable storage medium of claim 24, wherein the depth information is determined by adding a predetermined value and a difference between the level of the target node and the lowest level of the tree.

26. The computer-readable storage medium of claim 24, wherein the method further comprises:
  determining the level of the target node, based on a number of occurrences of the padding code of the node identifier of the target node.

27. A terminal apparatus comprising:
  a location information storage device configured to store location information about a path from a root node to a target node of a tree, the location information including at least a first branch identifier indicating the order that the target node branches from its respective parent node;
  a control unit configured to generate a group identifier for each initial node that directly branches from the root node, wherein each respective child node of an initial node shares the same group identifier, and configured to select a padding code that has a value of a group identifier that is different from a value of a group identifier of an initial node corresponding to the target node; and
  a padding information storage configured to store padding information including the padding code and depth information of the target node,
  wherein the control unit is further configured to generate a node identifier of the target node by combining the location information and padding information.

28. The terminal of claim 27, wherein the location information is generated by sequentially allocating branch identifiers, each of the branch identifiers being allocated for each branch from the root node to the target node.

29. The terminal of claim 27, wherein the depth information is determined by adding a predetermined value to a difference between the level of the target node and the lowest level of the tree.

* * * * *